(12) United States Patent
Petty et al.

(10) Patent No.: US 6,546,263 B1
(45) Date of Patent: Apr. 8, 2003

(54) APPARATUS AND METHOD FOR COMPACT ICON DISPLAY

(75) Inventors: John S. Petty, Chapel Hill, NC (US); Srinivas Sarma, Durham, NC (US); Richard P. Fahey, Apex, NC (US); Roger J. Osborn, Jr., Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 506 days.

(21) Appl. No.: 09/592,131

(22) Filed: Jun. 12, 2000

(51) Int. Cl.$^7$ .................................................. H04B 1/38
(52) U.S. Cl. ...................... 455/566; 455/90; 455/550; 455/573; 345/771; 345/173; 345/158
(58) Field of Search .......................... 455/90, 550, 566, 455/573; 345/771, 173, 158

(56) References Cited

U.S. PATENT DOCUMENTS

| | | | | |
|---|---|---|---|---|
| 6,211,858 B1 | * | 4/2001 | Moon et al. ................. | 345/771 |
| 6,415,164 B1 | * | 7/2002 | Blanchard et al. .......... | 455/566 |
| 6,418,329 B1 | * | 7/2002 | Furuya ....................... | 455/566 |

* cited by examiner

*Primary Examiner*—William Trost
*Assistant Examiner*—Danh C Le
(74) *Attorney, Agent, or Firm*—Coats & Bennett, P.L.L.C.

(57) ABSTRACT

A method and apparatus is described for the sequential display of status information on a mobile terminal by means of a rotating-icon. The operating condition of the mobile terminal is monitored and a plurality of status icons is selected and sequentially displayed for a predetermined time in substantially the same area of at least one screen such as a pixel screen. The predetermined time corresponds to $M+(PV/S)$, where M is the minimum display time for each status icon, P is the priority allocated to a status icon about to be displayed in the at least one screen, S is the sum of all the priorities of the status icons in the selected plurality of status icons, and $V=T-MN$, where T is the total period of time allocated to sequentially display the selected plurality of status icons, and N is the number of status icons in the selected plurality of status icons. The mobile terminal includes a housing, at least one screen, a memory, a timer, a plurality of operating parameter detectors, and a processor. The processor is operably coupled to the at least one screen, memory, the plurality of operating parameter detectors, and the timer; the processor is responsive to the plurality of operating parameter detectors and selects appropriate status icons for sequential display in the at least one screen.

13 Claims, 14 Drawing Sheets

APPARATUS AND METHOD FOR COMPACT ICON DISPLAY

BACKGROUND OF THE INVENTION

The invention is directed to a method and apparatus for the efficient display of status information on a screen such as a compact pixel screen found on a palm top computer, a personal digital assistant, and a cellular communication device such as a cellular telephone or pager.

One way to display status information, such as battery status, is to utilize a custom display with one or more icons built into the screen. The icons are activated and displayed when required. For example, a web ready cellular phone might display an email icon when an email arrives. Such icons can be very small since they can be continuous line drawings rather than pixel based bit maps. However, custom screens are generally more expensive to make than standard screens. Also, icons that are built into a custom screen detract from viewable space.

Another approach for displaying information is to utilize individual light emitting diodes ("LEDs") or their equivalent. For example, an activated or flashing red LED might indicate low battery status on a cellular telephone or laptop computer and a flashing yellow LED might indicate a busy hard drive on a laptop computer. Many laptops use a multicolored LED to indicate battery status. LEDs offer a crude solution to displaying information and require the user to know, for example, what information a flashing LED is supposed to convey. Alternatively, some sort of label or symbol is required such as a battery symbol located immediately adjacent to a particular LED to indicate to the user what type of information the LED is supposed to convey.

SUMMARY OF THE INVENTION

In one aspect of the invention, a method is provided for providing an indication of the status of operating conditions of a mobile terminal. A first and second operating parameter of the mobile terminal is monitored and priority levels assigned to the different conditions of the first and second operating parameters. Selected status icons, associated with the conditions of the first and second operating parameters, are displayed for a variable selected time period in an assigned area on the mobile terminal. The variable selected time period is based on the assigned priority level for each selected status icon.

In one form of the invention, the variable selected time period for each of the selected status icons corresponds to M+(PV/S), wherein M is a minimum display time period for each status icon, P is the priority associated with the selected status icon about to be displayed in the display area, S is a sum of all the priority levels associated with all of the selected status icons, and V=T−MN, where T is the total period of time allocated to sequentially display the selected status icons, and N is the number of selected status icons.

In another form of the invention, the first operating parameter is battery power and the second operating parameter is signal strength.

In one aspect of the invention, the mobile terminal usable comprises: a housing; at least one screen (such as a pixel screen) attached to the housing, wherein a defined area in the at least one screen is dedicated to sequentially displaying a plurality of selected status icons; a first detector monitoring a first operating parameter of the mobile terminal for determining a priority level of the first operating parameter; a second detector monitoring a second operating parameter of the mobile terminal for determining a priority level of the second operating parameter; a memory storing a first set of status icons associated with the priority levels of the first operating parameter and a second set of status icons associated with the priority levels of the second operating parameter; and a processor operably coupled to the at least one screen, the memory, and the first and second detectors, the processor selecting the status icon from the first set associated with the priority level of the first operating parameter determined by the first detector and selecting the status icon from the second set associated with the priority level of the second, and controlling sequential display of the selected status icon from the first set and the selected status icon from the second set for time periods dependent on the priority levels of each of the first and second operating parameters determined by the first and second detectors.

In one form of the invention, the mobile terminal's first detector monitors battery power and the second detector monitors signal strength.

BRIEF DESCRIPTION OF THE DRAWINGS

The following is a brief description of the drawings that are presented for the purposes of illustrating the invention and not for purposes of limiting the same.

DETAILED DESCRIPTION OF THE INVENTION

While the invention will be described in connection with one or more embodiments, it should be understood that the invention is not limited to those embodiments. On the contrary, the invention includes all alternatives, modifications, and equivalents as may be included within the spirit and scope of the appended claims.

It should be understood that the term "mobile terminal", as used in the context of the invention, applies to mobile electronic devices such as a personal digital assistant ("PDA") such as a web ready PDA, a palm top computer, a laptop computer, and a cell phone.

Figure 1:
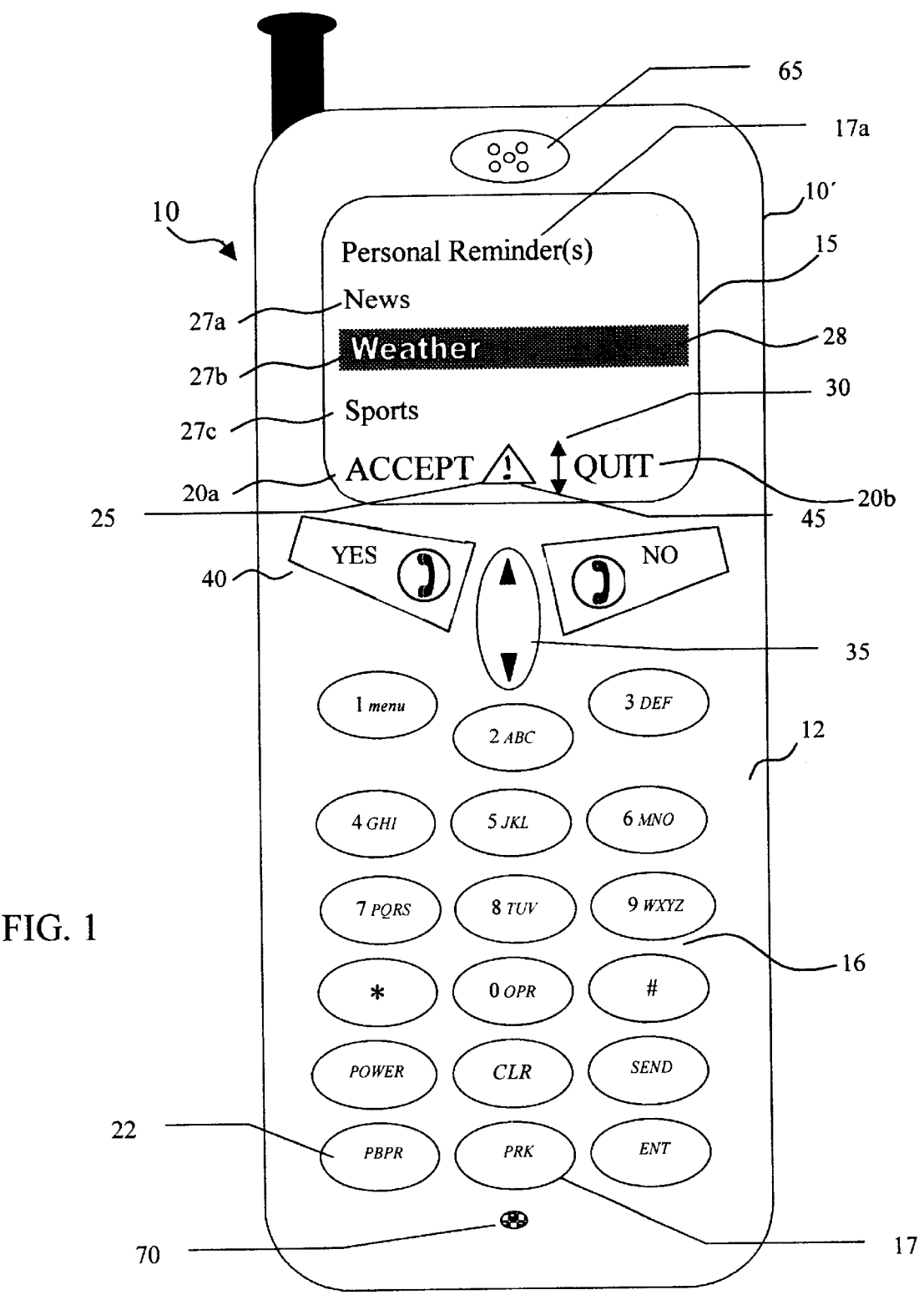
FIG. 1 shows a mobile terminal in the form of a cell phone with a pixel screen configured according to one aspect of the invention.

FIG. 1 shows a mobile terminal 10 in the form of a cellular telephone 10' with a screen 15 (such as a pixel screen) and an alphanumeric keypad 16. The keypad 16 includes a personal reminder key ("PRK") 17 and a playback personal reminder key ("PBPR") 22. The screen 15 is configured according to one embodiment of the invention. The screen 15 is partitioned into horizontal bars of pixels dedicated to displaying the text labels: exemplary labels "News", "Weather", and "Sports" shown at 27a, 27b, and 27c, respectively. A screen version of the PRK key 17 is represented by text label 17a. Beneath the horizontal bars are two text labels "ACCEPT" and "QUIT" at 20a and 20b, respectively. The "ACCEPT" and "QUIT" at 20a and 20b, respectively, are hereafter referred to collectively as "soft labels". Immediately adjacent to the soft label "ACCEPT" at 20a is a rotating-icon represented at 25. An up-down arrow icon 30 is located between the rotating-icon 25 and the soft label "QUIT" at 20b. The rotating-icon at 25 is shown displaying a triangular alert symbol, represented at 45, indicating that the mobile terminal 10, here a cellular telephone 10', is currently not connected to a cellular network.

The terms "displaying" and "writing" are hereafter regarded as equivalent terms.

Figure 2:
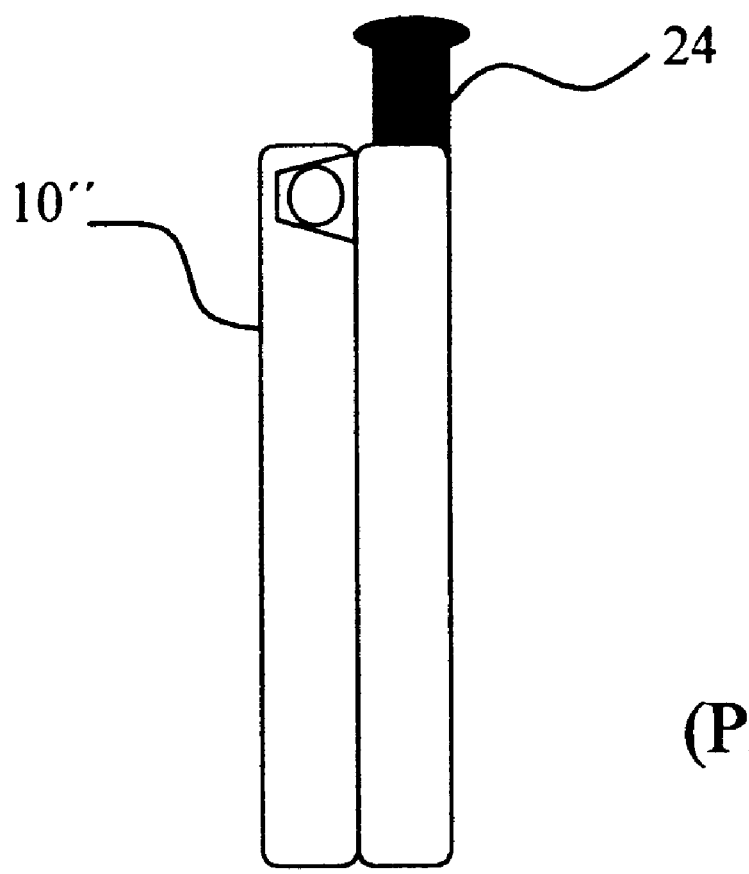
FIG. 2 is a side view of a fold-up cell phone in a closed position according to the prior art.
Figure 2A:
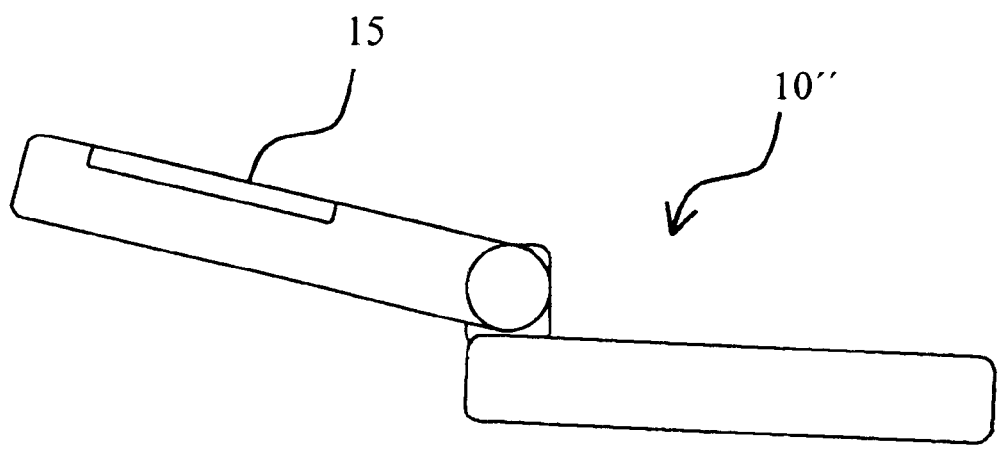
FIG. 2A is a cross-section side view of a fold-up cell phone in an open position according to the prior art.
Figure 2B:
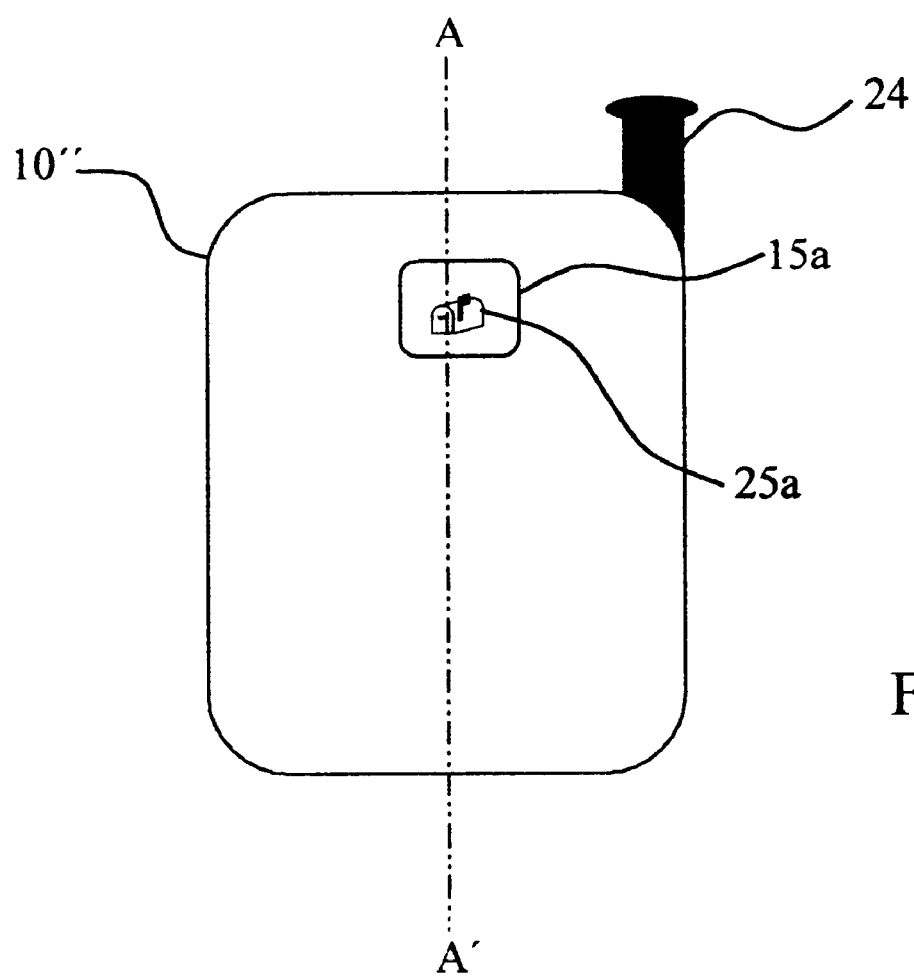
FIG. 2B is a front view of a fold-up cell phone according to one aspect of the invention.
Figure 2C:
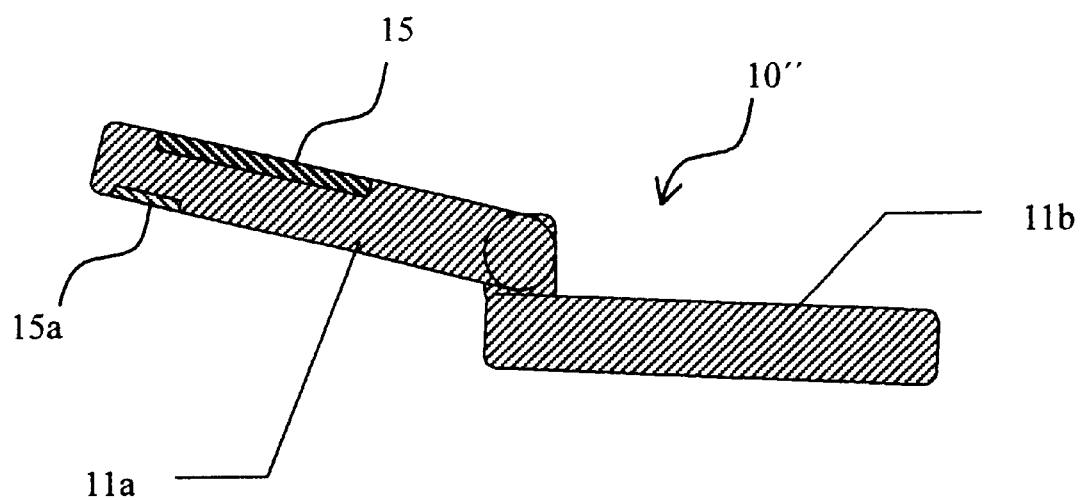
FIG. 2C is a cross-section side view along axis A–A' of a fold-up cell phone in an open position according to one aspect of the invention.
Figure 2D:
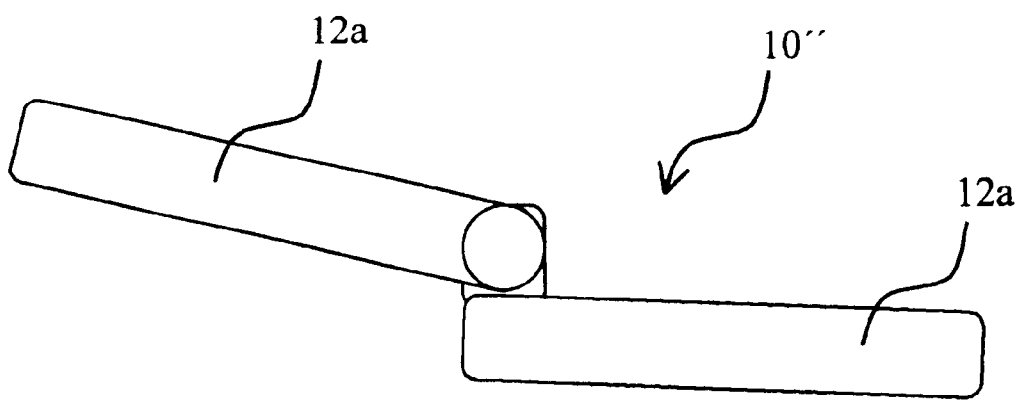
FIG. 2D is a side view of a fold-up cell phone in an open position according to the prior art.
Figure 3:
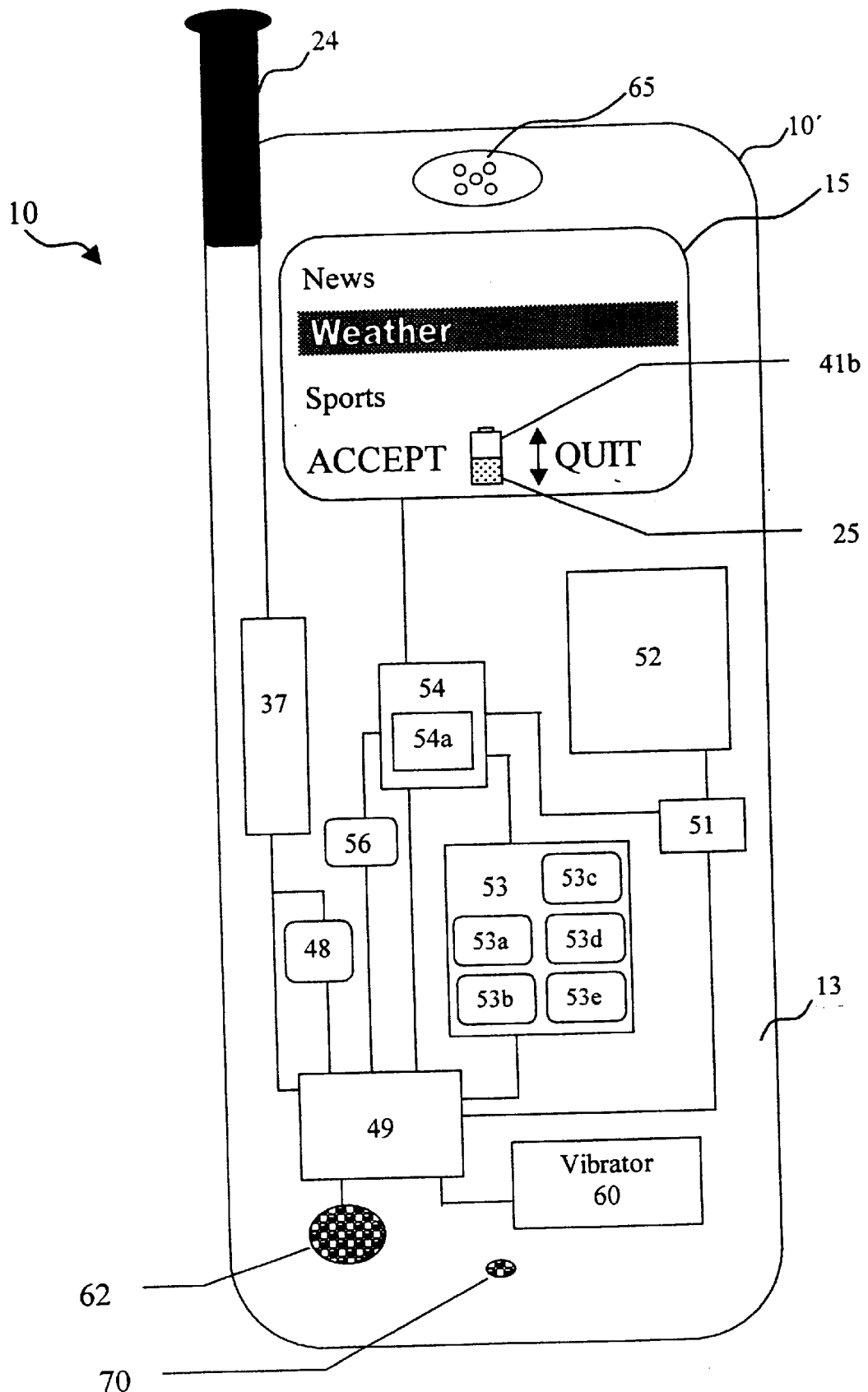
FIG. 3 is a block diagram of a mobile terminal equipped to display a rotating-icon.

In one embodiment, the cellular phone 10' also includes a housing 11, the housing comprises an exterior surface 12 (FIG. 1), a housing interior surface 13 (FIG. 3). The housing may include more than one housing section such as is the case with fold-up cell phones that comprise two housing sections (e.g., 11a and 11b, see FIG. 2C) that are movingly interconnected and close together like a clam (e.g., see FIGS. 2B and 2C). The exterior surface 12 typically includes a sidewall 12a (e.g., see FIG. 2D).

A user can scroll up and down between horizontal fields 27a, 27b, and 27c using a toggle button 35. If the user desires "Weather" information 27b, the toggle button 35 is used to move the highlight 28 to the horizontal bar for Weather 27b and then the user accepts that selection by pressing the "YES" button 40 beneath the soft label "ACCEPT" 20a. It should be understood that the description of how a user selects a particular horizontal field is only included for completeness and does not form part of the invention described herein.

Figure 1A:
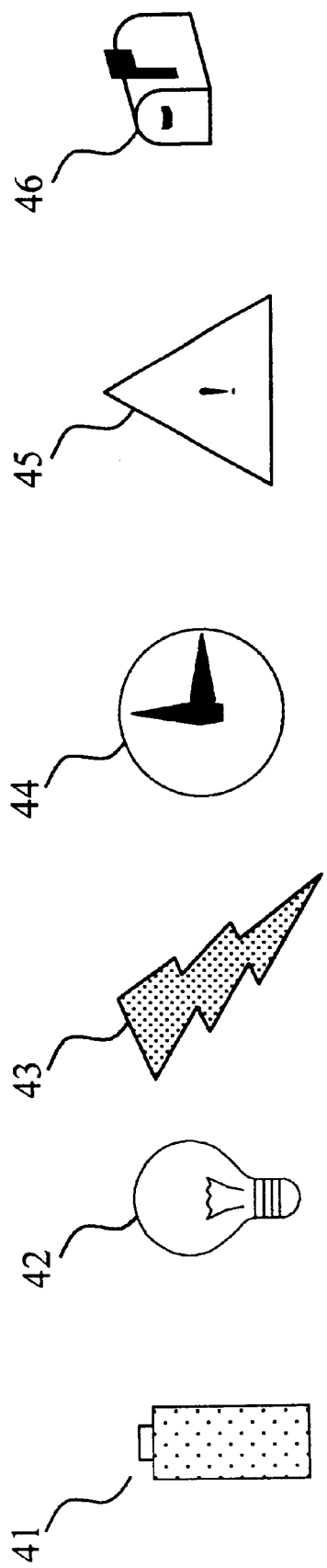
FIG. 1A shows examples of status icons that are written to a rotating-icon according to one aspect of the invention.

The rotating-icon 25 rotates through various status icons (see FIG. 1A) including, for example, battery status icon 41, personal reminder icon 42, received signal strength icon 43, clock icon 44, network alert icon 45, and an email-received icon 46. Thus, while a network alert status icon 45 with a triangle encompassing an exclamation mark is shown in FIG. 1 at 25, the network alert status icon is periodically replaced with other status icons as described hereafter. Since the screen 15 requires only a small area to operate the rotating-icon 25, a number of status icons can be displayed in turn without taking up a larger area that would be required to display the status icons simultaneously and thus a greater percentage of the screen 15 is devoted to displaying other information such as horizontal fields 27a, 27b, and 27c.

Thus, selected status icons are sequentially displayed in substantially the same area in display 15 to provide a rotating-icon of selected status icons. The selected status icons may involve displaying a subset of less than all of the possible status icons. For example, if the battery is fully charged or if there is no waiting e-mail, the rotating-icon could not display those icons to minimize display activity.

The term "icon-cycle" is used to refer to writing a complete cycle of status icons to at least on, screen (e.g., sequentially writing a complete cycle of status icons to the rotating-icon 25 in screen 15, and optionally simultaneously writing a complete cycle of status icons to a second rotating-icon 25a in screen 15a (see FIGS. 2B and 2C)).

Figure 1B:
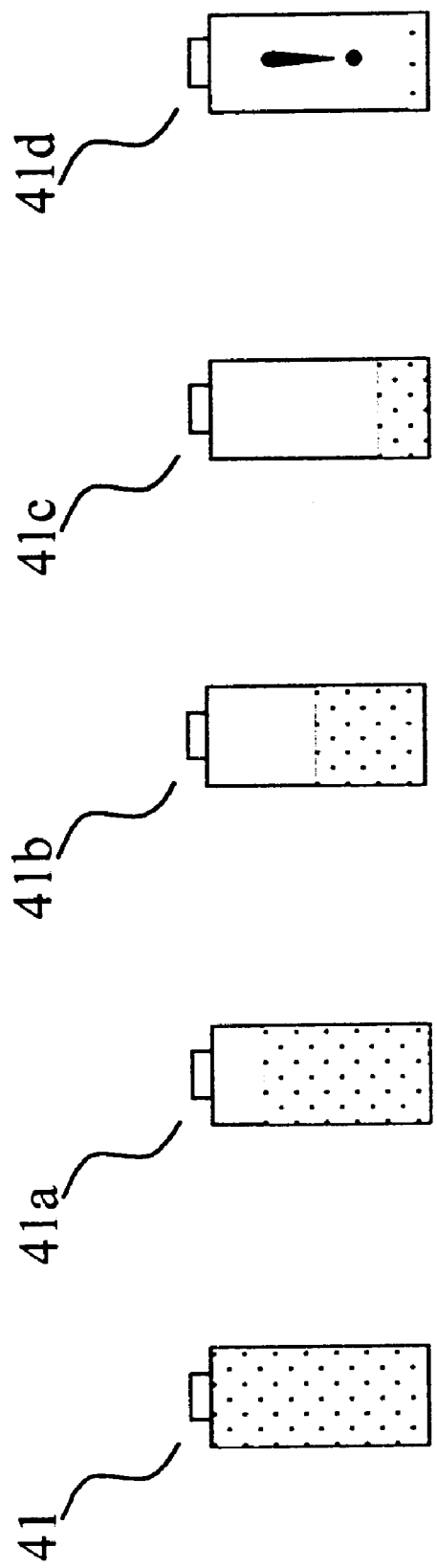
FIG. 1B shows examples of a battery status icon indicating various degrees of charge.

The battery status icon indicates the amount of charge on the battery powering the mobile terminal 10. FIG. 1B shows examples of the battery status icon indicating various degrees of charge: full charge is represented at 41, ¾ charge at 41a, ½ charge at 41b, ¼ charge at 41c, and almost nil charge at 41d. In this embodiment, the almost nil charge battery status icon 41d also includes an exclamation mark indicating imminent failure of the mobile terminal due to a critically low battery level. Thus, the type of battery status icon written to the rotating-icon 25 should correspond to the charge on the battery.

The personal reminder icon 42 reminds the user about a personal matter. The personal reminder icon 42 may be integrated with an internal diary chronicling the user's appointments and when the time for a particular appointment approaches the reminder icon 42 is included among the icons sequentially displayed in the rotating-icon 25.

Figure 1C:
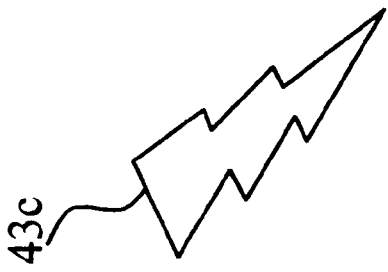
FIG. 1C shows examples of a received signal strength icon indicating various degrees of received signal strength.
Figure 1C:
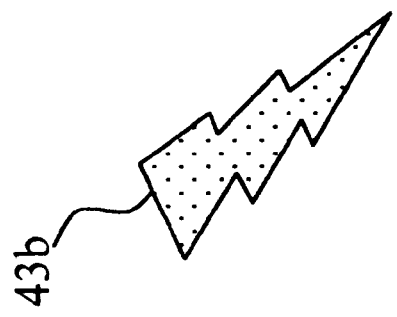
Figure 1C:
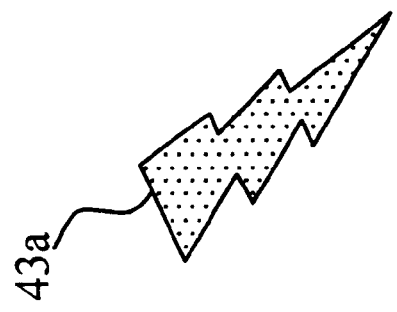
Figure 1C:
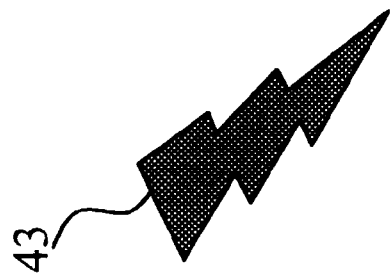

The received signal strength icon provides information on the status of the signal strength received from the cellular network on which the mobile terminal 10 is camped. FIG. 1C shows examples of the received signal strength icon indicating various degrees of received signal strength: full received signal strength is represented at 43, highly satisfactory received signal strength at 43a, satisfactory strength at 43b, and unsatisfactory strength at 43c. With a suitable color display the signal strength icon 43c indicating unsatisfactory strength, as, represented at 43c in FIG. 1C, may be displayed in a color such as red.

The clock icon 44 (see FIG. 1A) provides a clock feature. For example, the user can set a timer (e.g., timer 56 in FIG. 3) built into the mobile terminal 10 (such as a cell phone 10') for thirty minutes at the beginning of a business meeting and the clock icon 44 will display the time remaining until the conclusion of the thirty-minute period.

The network alert icon 45 alerts the user that the mobile terminal 10 has lost its connection to the cellular network. Alternatively, the network alert icon could be no icon, that is, the lack of a network connection could be indicated by the omission of any icon relating to the status of the network connection in the rotating-icon 25. Such a "no icon" display could, of course, also be used in connection with other conditions. For example, the omission of any icon relating to email could indicate that there is no new email.

The email-received icon 46 alerts the user that email has arrived.

The area of pixels specifically mapped to the rotating-icon display is preferably located at a convenient location on the screen 15. In the exemplary embodiment of the invention depicted in FIG. 1, the area of pixels specifically mapped to the rotating-icon is defined by a pixel block between the text label "ACCEPT" at 20a and the double-arrowed icon 30. The pixel block devoted to the rotating-icon does not extend into the horizontal "Sports" field 27c and is sized to complement the font size adopted by the "ACCEPT" and "QUIT" soft labels, 20a and 20b, respectively. The exact location and number of pixels devoted to the rotating-icon can vary, with the status-icons written to the same patch or block of pixels dedicated to the rotating-icon so as to free up a significant proportion of the remainder of the screen 15 for displaying other icons or text labels.

In one embodiment of the invention, the area of pixels in the screen 15 is used for displaying the rotating-icon 25. The area of pixels used for displaying the rotating-icon 25 is defined by an origin with "x" and "y" Cartesian coordinates. The defined area of pixels has a point of origin and extends in an x and y direction from the origin. For example, an area of pixels defined by an origin of 100, 10 (representing x, y) and extending by 100 pixels in the positive x direction and 100 pixels in the positive y direction to provide a 100*100 block of pixels with an origin of 100, 10. The size of the pixel block (i.e. area of pixels devoted to displaying the rotating-icon) is largely dependent on the pixel resolution of the screen 15 arid the minimum size of icon needed to be comfortably seen by a human eye. The act of writing selected status icons in succession to the same pixel block creates the rotating-icon.

In another embodiment, more than one screen 15 is used to display the rotating-icon 25. A secondary pixel screen 15a (having just enough pixels to display a secondary rotating-icon 25a) is located away from the main screen 15. The secondary rotating-icon 25a is written to the secondary pixel screen 15a. The secondary rotating-icon 25a is under the control of the rotating-icon controller 54a (see FIG. 3) and mirrors the output written to the rotating icon 25 located in the main screen 15. The secondary screen 15a is preferably continually switched on and located in clear view on the exterior of the mobile terminal 10 so that the user does not have to power up the main screen 15 to view the rotating-icon 25a. For example, in a mobile terminal 10 (such as a prior-art fold-up cell phone 10" illustrated in FIG. 2) having pivoted parts that conceal the display screen 15, the user would have to swing the pivoted parts away from each other in order to view the display screen 15 (see FIG. 2A). The screen 15 would also have to be powered up to view the rotating-icon 25. In contrast, when the secondary screen 15a (which is dedicated to displaying the secondary rotating-icon 25a and therefore may be small) is located on the exterior of the fold-up cell phone 10" (see FIGS. 2B and 2C) the user can easily view the rotating-icon 25a without opening the fold-up cell phone 10" or powering up the cell phone screen 15 in order to view rotating-icon 25.

It should be understood that the secondary screen 15a could be used to display the rotating-icon 25a in preference to the screen 15 displaying rotating-icon 25. For example, the rotating-icon controller 54a could optionally disable the rotating-icon 25 in the main screen 15 when the entire area of the screen 15 is required. For example, the rotating-icon controller 54a could run the rotating-icon 25a in screen 15a when the main screen 15 (including the rotating-icon 25) is disabled during periods when the battery monitor 51 (see FIG. 3) is reporting a low charge in the mobile terminal battery 52 (FIG. 3).

In the context of mobile terminals such as a palm top computer or lap top computer, the secondary screen 15a could be located on the outside of the mobile terminal to be visible to a user when the mobile terminal is closed and the main screen 15 is not viewable.

FIG. 3 is a block diagram of the mobile terminal 10, represented here as the cellular phone 10', according to one embodiment of the invention. The top half of the housing 11 is removed to show a housing interior surface 12 and the various components of the mobile terminal 10 positioned inside the housing 11. An antenna 24 is connected to a transceiver 37, which is further connected to a signal strength monitor 48 and a mobile terminal processor 49. The signal strength monitor 48 is further connected to the mobile terminal processor 49. The mobile terminal processor 49 is further connected to a battery monitor 51, a memory 53, a display controller 54, a timer 56, a vibrator 60, and an audible alarm 62. The timer is further connected to the display controller 54 and the battery monitor 51 is further connected to a battery 52. The memory 53 includes an email memory 53a, a personal reminder memory 53b, a priority level memory 53c, a status icon picture memory 53d which stores the pixel map of each status icon, and an operating status memory 53e. The cellular phone 10' also includes a speaker 65 and a microphone 70.

The housing 11 provides the framework on which the various components of the cell phone 10' are positioned (i.e., housed); for example, the processor 49, memory 53, screen 15, signal strength monitor 48, battery 52, battery monitor 51, and timer 56 are positioned in the housing 11. Components could also be mounted on or positioned on the housing exterior surface 12 as well as the interior surface 13.

It should be understood that while the mobile terminal 10 could include more than one housing 11 (e.g. two housing sections 11a and 11b in FIG. 2C). In addition, the housing includes various openings to allow components to penetrate the housing 11, such as the antenna 24 and keys in the keypad 16. For example, the housing 11 could be constructed to allow the screen 15 to be easily viewed by a user. Thus, the housing 11 as described here should not be regarded as exhaustive or limiting the invention in any way.

If the cell phone 10' were a digital cell phone, a digital to analog converter (not shown) would convert incoming digitized speech signal to analog output for the speaker 65 and an analog to digital converter would convert sound signal picked up by the microphone 70 to digital signal suitable for transmission.

The battery monitor 51 is further connected to a battery 52 that powers the mobile terminal 10, and the display controller 54. The rotating-icon at 25 is shown (in screen 15) displaying the battery status icon 41b (see FIG. 1B) indicating that the battery 52 is at half charge. The display controller 54 is further connected to the screen 15, the battery monitor 51, the memory 53, and the timer 56. The display controller 54 includes a rotating-icon controller 54a.

In one embodiment, the processor 49 is directly or indirectly operably connected to every component shown in FIG. 3.

It should be understood that the mobile terminal processor is also operably connected to other hardware elements (e.g. a keypad). The mobile terminal processor 49 forms part of a cellular telephone circuit built into the mobile terminal 10 that enables the mobile terminal 10, such as a cell phone 10', to operate with a cellular telephone network and handle voice and data signals between the mobile terminal 10 and the public cellular network. The mobile terminal processor 49 also communicates with other components in the mobile terminal 10 (e.g., a keypad controller, though the keypad controller could be integrated into the mobile terminal processor 49).

It should be understood that the signal strength monitor 48 and the battery monitor 51 are examples of operating parameter detectors that monitor and detect changes in the operating parameters of the mobile terminal 10. The processor 49 is responsive to and operably coupled (directly or indirectly) with each operating parameter detector in mobile terminal 10.

It should also be understood that several of the components described in the context of FIG. 3 may be performed in software and could be integrated. For example, the separate functions of the signal strength monitor 48 and the mobile terminal processor 49 could be integrated with processor 49. Likewise, the memory 53 (including sub-memories 53*a*, 53*b*, 53*c*, 53*d*, and 53*e*) could be integrated with the mobile terminal processor 49 along with the display controller 54. The display controller 54 could be further integrated with the timer 56 and the timer 56, display controller 54, including the rotating-icon controller 54*a*, could be integrated with the mobile terminal processor 49. The operation of the rotating-icon controller 54*a* may be performed in software and integrated with the software controlling the display controller 54. The battery monitor 51 is optionally further connected to the rotating-icon controller 54*a*. In addition, the signal strength monitor 48 and battery monitor 51 could be integrated into processor 49. Thus, the embodiment described in the context of FIG. 3 should not be regarded as exhaustive or limiting the invention in any way.

Figure 4:
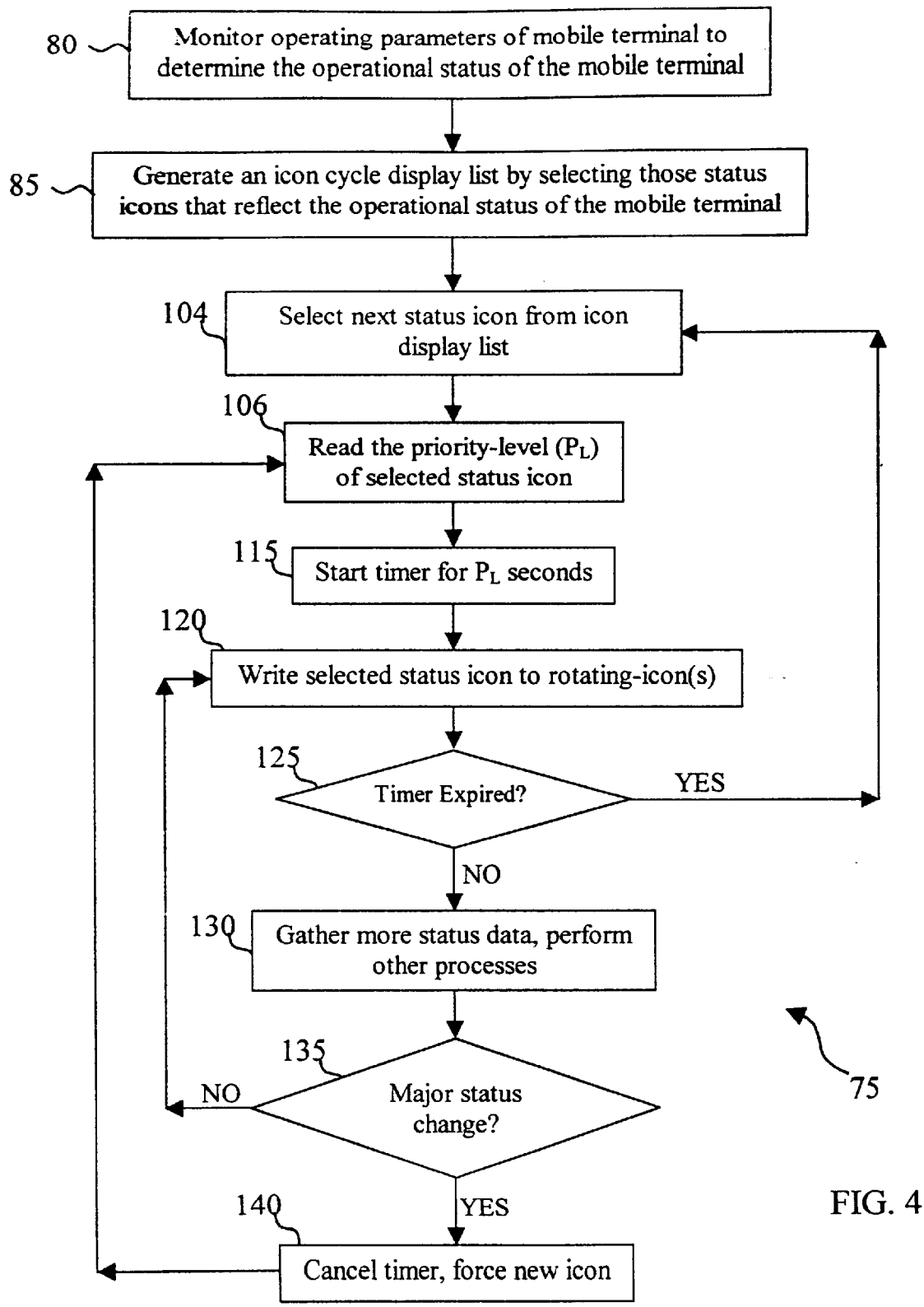
FIG. 4 is a flow chart depicting the logic steps in performing at least one icon-cycle, according to one aspect of the invention.

FIG. 4 is a flow chart 75 depicting the logic steps in completing an icon-cycle, according to one aspect of the invention. The operating parameters of the mobile terminal are monitored at 80 and an icon cycle display list is generated at 85 by selecting those status icons that reflect the operational status of the mobile terminal 10 (e.g., battery charge, signal strength, email status etc.) For example, the processor 49 could generate the icon cycle display list.

An icon from the icon cycle display list (generated at 85) is picked (e.g., by the rotating-icon (controller 54*a* or the processor 49) at 104 (FIG. 4) for display in the rotating-icon(s) 25 and/or 25*a*. For example, depending on the charge reported by the battery monitor 51 the rotating-icon controller 54*a* determines which battery status icon 41 to display at 104. In scenario #2 (Table 1) the battery monitor 51 (column #2) reports that the battery 52 is at ¾0 charge forcing the selection of battery status icon 41*a* (see FIG. 1B) at 104, and the allocation of a priority level-2 at 106 (FIG. 4). The rotating-icon controller 54*a* then sets the timer 56 to 2 seconds resulting in the display of the battery status icon 41*a* for 2 seconds per icon cycle. In scenario #4, the battery is only at ¼ charge resulting in the allocation of a priority level-4 and a display time of 4 seconds.

Priority levels for each status icon may be mapped to particular values that are stored in the priority level memory 53*c* (see Table 1) and read by the rotating-icon controller 54*a* to set the timer 56. For example, in scenario #3 (Table 1) a priority level-3 is allocated and the rotating-icon controller 54*a* sets timer 56 to 3 seconds causing the battery status icon 41*b* to be displayed for 3 seconds in the rotating-icon 25.

TABLE 1

| Scenario # | Battery monitor 51 reports the battery 52 status | Battery status icon selected (see FIG. 1B) by the rotating-icon controller 54a | Corresponding priority level ("P$_L$") stored in the priority level memory 53c | Priority level read from memory 53c by the rotating-icon controller 54a that sets timer 56 for P$_L$ seconds | Display time per cycle of the rotating-icon 25 on screen 15 (in seconds) |
|---|---|---|---|---|---|
| 1 | full charge | 41 | priority level-1 | 1 second | 1 |
| 2 | ¾ charge | 41a | priority level-2 | 2 seconds | 2 |
| 3 | ½ charge | 41b | priority level-3 | 3 seconds | 3 |
| 4 | ¼ charge | 41c | priority level-4 | 4 seconds | 4 |
| 5 | almost nil charge | 41d | priority level-5 | 5 seconds | 5 |

Still referring to FIG. 4, once the priority level of the icon is read at 106, the timer 56 is set for $P_L$ seconds at 115 and the icon is written to the rotating-icon(s) 25 and/or 25*a* at 120. In aid writing the selected status icon to the rotating-icon(s) 25 and/or 25*a* at 120, the rotating-icon controller 54*a* downloads the picture of the selected status icon from the picture memory 53*d*. The timer 56 is monitored at 125. Until the timer 56 reports time expired, the rotating-icon controller 54*a* is free to perform other tasks at 130 such as monitoring for a major status change in the mobile terminal 10 at 135. If no major status change is detected at 135, the timer 56 is analyzed at 125 and if the timer has not expired the rotating-icon controller 54*a* is again free to perform other tasks at 130. When the timer 56 reports a time end signal another icon is selected at 104.

If a major status change is detected at 135 (FIG. 4), the timer is cancelled and the status icon corresponding to the major status change is forced (i.e. immediately selected) at 140 and the priority of the forced status icon is read at 106. For example, a failing battery would be one type of event that would trigger a major status change at 135. In that case, the timer is cancelled and the battery-warning icon (e.g., 41*d*) selected at 140 and furnished with a priority level (in P seconds) at 106 (e.g. see scenario #5 in Table 1), the timer is set for P seconds at 115, and the icon written to the rotating-icon 25 at 120. Optionally, the time verification at 125 is delayed for a time period (e.g., about 5 to 10 seconds) to ensure that if a further major status change is detected at 135 then the current warning status icon is displayed for at least a minimum time in the rotating-icon 25. Optionally, if more than one major status change is in play, the rotating-icon controller 54*a* may cause the rotating-icon 25 to display each warning-status icon in turn (e.g., 10 seconds per warning status icon per cycle of the rotating-icon).

In another embodiment of the invention, the priority level ("P") is set in seconds at four different priority levels of priority level-n, where n varies between 0 and 3. For example, in FIG. 4 a priority level ("$P_L$") of 2 (i.e., priority level-2) at 106 would cause the status icon to be written to the rotating-icon 25 for 2 seconds per cycle at 120. In this embodiment the battery status icon 41, for example, would be restricted to just four icon types such as 41, 41*b*, 41*c*, and 41*d*, that could be displayed for zero, one, two, and three seconds so that only battery status icons 41*b*, 41*c,* and 41*d* would be displayed for one, two, and three seconds depending on the battery charge reported by the battery monitor 51. For example, the email status icon 46 could be displayed for zero, one, two, and three seconds according to, for example, how many emails have been received. Thus, the rotating-icon 25 offers considerable flexibility in how it is used and the examples depicted here are not intended to be exhaustive or limiting of the invention.

The priority level allocated to a specific icon varies between two or more priority levels. For example, in one embodiment when the mobile terminal, such as a cell phone 10, has received email, a priority level of 1 second is attached to the email-received icon 46. However. when the email received includes an email marked urgent, the priority level is increased to 2 seconds resulting in a display time of 2 seconds in the rotating-icon 25 (and/or 25*a*) at 120 in FIG. 4 (i.e., on screen 15 in FIG. 1). If the received email includes more than one email marked urgent the priority level is increased to 3 seconds.

In another embodiment the priority level for a particular icon is set to a period in seconds which forces the rotating-icon to display only that icon. For example, a low battery icon indicating a critical battery level is set in seconds to a value greater than the expected time for complete battery failure. In this embodiment the rotating-icon shall display the low battery icon until the battery fails thus providing maximum notice to the user of imminent battery failure.

Figure 4A:
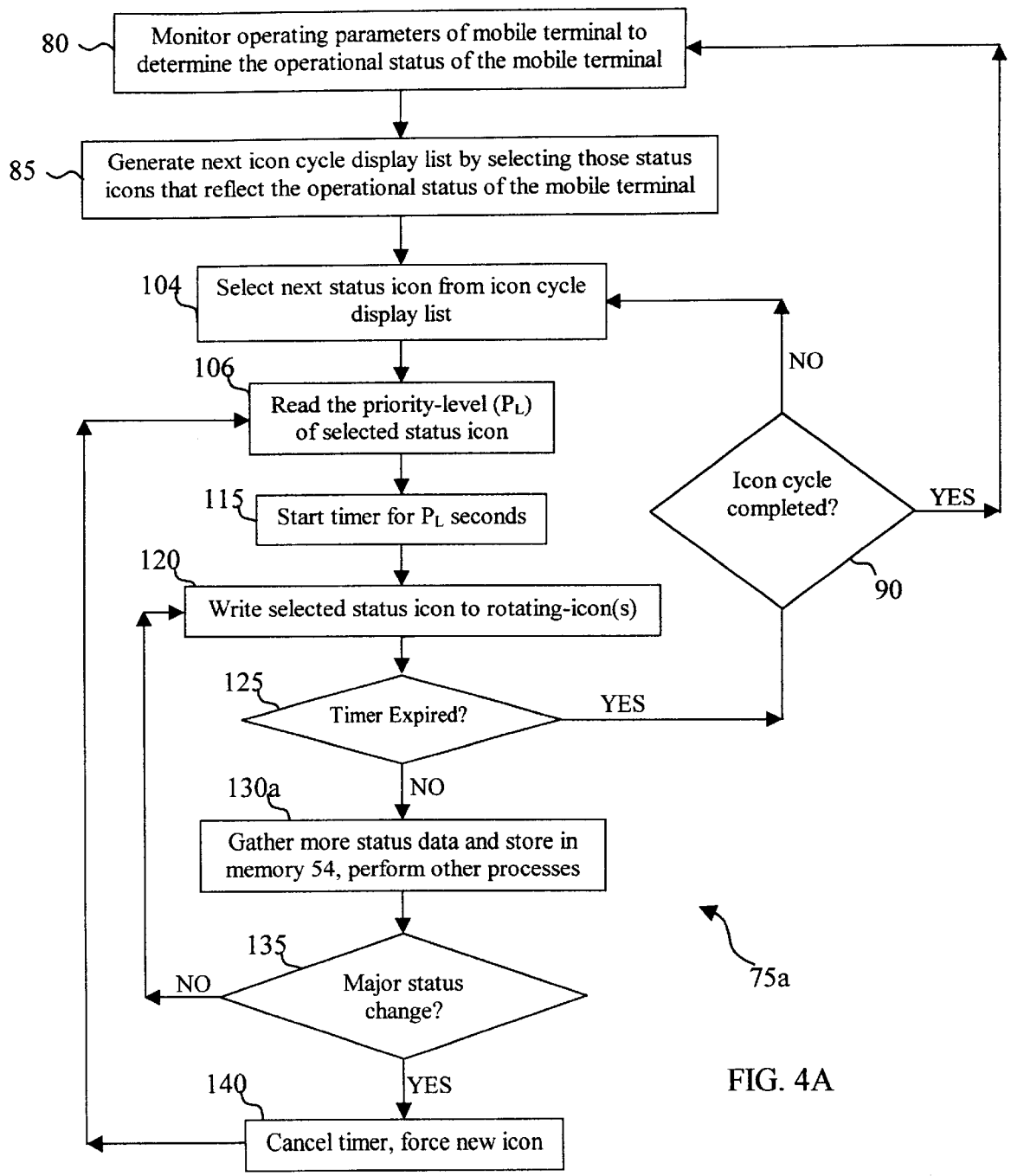
FIG. 4A is a flow chart depicting the logic steps in performing at least one icon-cycle, according to one aspect of the invention.

FIG. 4A is a flow chart 75*a* depicting the logic steps in completing more than one icon-cycle, according to one aspect of the invention. FIG. 4A incorporates the additional step 90 that determines if the current icon cycle has been completed. If the check at 90 indicates that the icon cycle has not been completed, the next status icon is selected from the icon cycle display list at 104. If the current icon cycle has been completed (i.e., all the status icons in the current icon cycle display list, generated at 85, have been sequentially displayed), then the operating status of the mobile terminal 10 is checked at 80 and a fresh icon cycle display list generated at 85.

It should be understood that the mobile terminal's status data generated by step 130*a* could be held in memory 53 (such as memory component 53*e*) and each time step 130*a* is performed the memory 53*e* maybe updated with fresh status data. Thus, when step 80 is performed, step 80 can be performed faster when the status data held in memory 53 is used to determine the operational status of the mobile terminal 10 in step 80.

Figure 5:
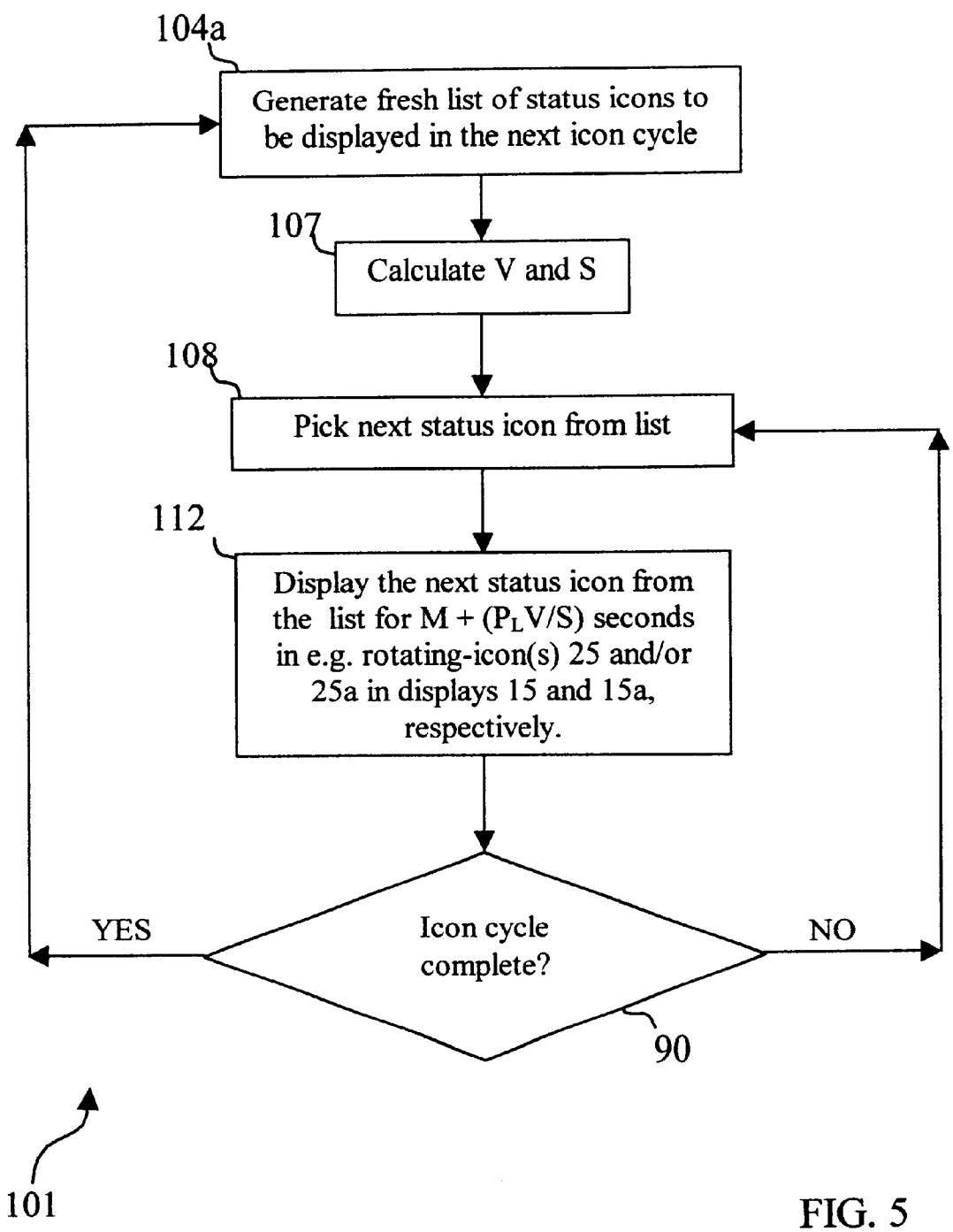
FIG. 5 is a flow chart depicting the logic steps involved in performing an icon-cycle, according to another aspect of the invention.

FIG. 5 is a flow chart 101 depicting the logic steps involved in performing an icon-cycle, according to another aspect of the invention. A list of every status icon to be displayed in the next icon cycle is generated at 104*a*. The priority level ("$P_L$") of every icon in the list is used to calculate "V" and "S" at 107; V is the variable amount of time used to differentiate among the various status icons, i.e. V=T−MN, where T is the total period of time to complete an icon cycle, M is the minimum display time for a status icon; N is the number of icons to be displayed in the icon cycle; S is the sum of all the priorities of all the status icons selected to be displayed in the rotating-icon(s) 25 and/or 25*a* (e.g., if there are two priority level-2 icons and one priority level-3 to be displayed in the rotating-icon 25, then S will equal 7).

The next status icon from the list is displayed in rotating-icon(s) 25 and/or 25*a* in displays 15 and 15*a*, respectively, at 112 (FIG. 5) for M+($P_L$V/S) seconds. For example, the timer 56 is set for M+($P_L$V/S) seconds and the status icon is displayed until the timer 56 expires. Thus, in this embodiment of the invention, each status icon in the list (see 104*a* in FIGS. 5 and 5A) is displayed at 112 (FIG. 5) for a time that varies at least partly in direct proportion to the priority level of that icon ($P_L$) and partly in inverse proportion to the sum of all the priorities levels of all the icons selected at 104*a* for display in the current icon cycle.

Still referring to FIG. 5, after the status icon has been displayed for M+($P_L$V/S) seconds at 112, a check is made at 90 to verify if the current icon cycle has been completed. That is, a check is made at 90 to verify if all of the status icons in the list generated at 104*a* have been displayed and, if not, the next status icon in the list is selected at 108 and displayed at 112 for M+($P_L$V/S) seconds. If the icon cycle has been completed, a fresh list of icons to be displayed in the next icon cycle is generated at 104*a*.

Figure 5A:
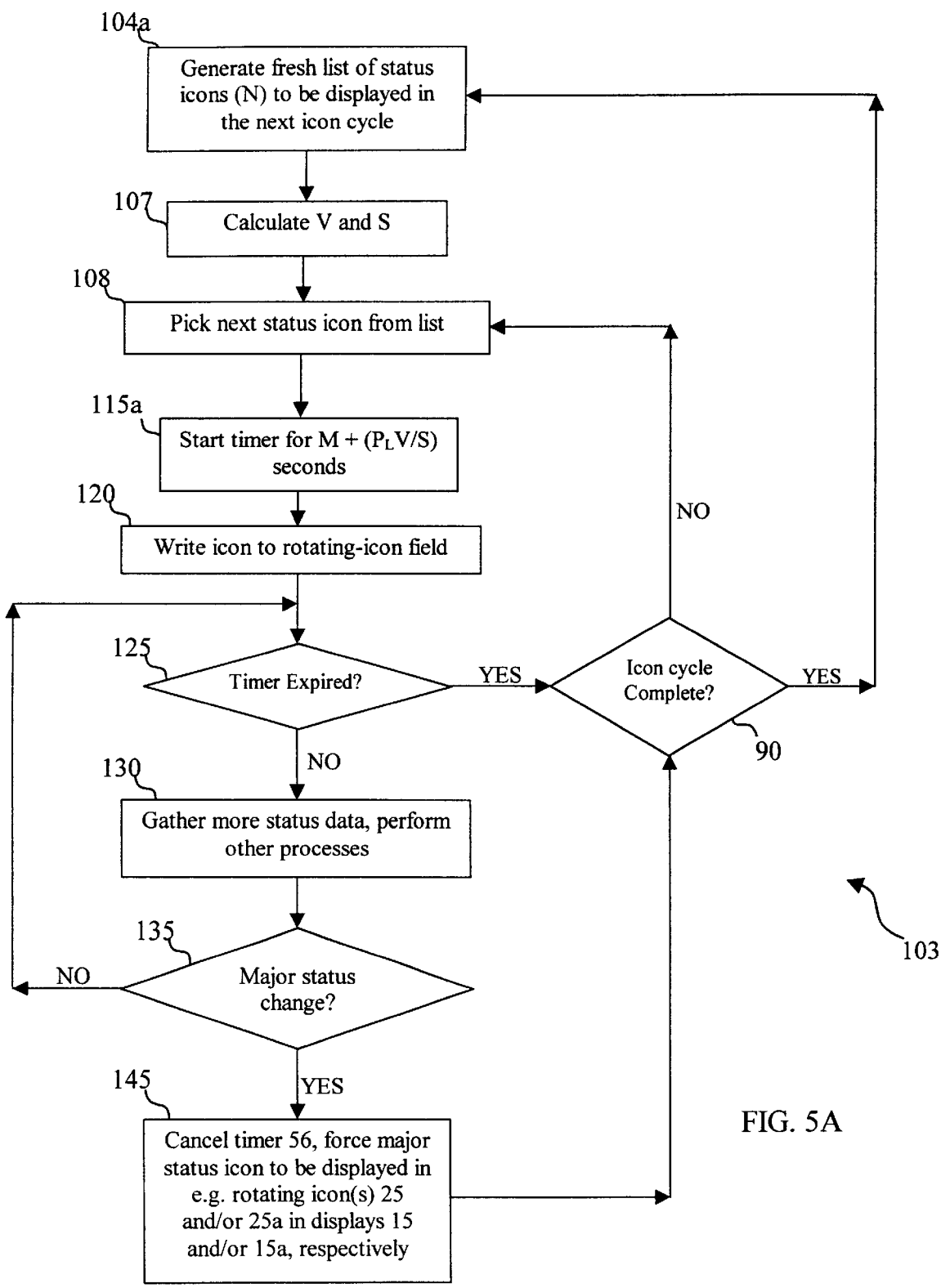
FIG. 5A is a flow chart depicting the logic steps involved in performing an icon-cycle, according to another aspect of the invention.

FIG. 5A is a flow chart 103 depicting the logic steps involved in performing an icon-cycle, according to another aspect of the invention. A list of every status icon to be displayed in the next icon cycle is generated at 104*a*. The priority level ("$P_L$") of every icon in the list is used to calculate "V" and "S" at 107. V is the variable amount of time used to differentiate among the various status icons (i.e. V=T−MN, as described above), and S is the sum of all the Priorities of all the status icons selected to be displayed in the rotating-icon(s) 25 and/or 25*a* (e.g., if there are two priority level-2 icons and one priority level-3 to be displayed in the icon-cycle, then S will equal 7).

Still referring to FIG. 5A, a status icon is selected from the list of status icons to be displayed in the current icon cycle at 108. The timer 56 is set for M+($P_L$V/S) seconds at 115*a* (the meaning of "V", "S", and "$P_L$" is as described above).

Still referring to FIG. 5A, the first icon is written to the rotating-icon 25 at 120 and the timer 56 is monitored at 125. If the timer has not expired, a processor controlling the display of the first icon is free to perform other tasks at 130 and monitor for a major status change at 135. If no major status change is detected at 135, the timer is analyzed at 125 and if the timer has not expired the processor is again free to perform other tasks at 130. When the timer 56 expires at 125 and a major status change has not been detected at 135, a check is made at 90 to verify if the current icon cycle has been completed (i.e., a check is made to see if all the status icons in the list generated at 104*a* have been displayed in the rotating icon(s) 25 and/or 25*a*). If the current icon cycle is not completed another status icon is selected from the list at 108. If the icon cycle has been completed, then a fresh list of status icons to be displayed in the next icon cycle is generated at 104*a*.

If a major status change is detected at 135, the timer 56 is cancelled and the appropriate warning status icon is displayed 145. For example, as discussed above, a battery about to fail due to lack of charge would be one type of event that would trigger a major status change at 135 and would force the selection of the battery-warning icon (e.g., 41*d*). If a major status change is detected at 135 (such as the battery monitor 51 detecting a battery nearly discharged) the steps in block 145 are carried out: the timer 56 is cancelled and reset to a time in keeping with the major status change (e.g. battery status icon 41*d* in FIG. 1B). If the battery status icon 41*d* is selected, the timer 56 is preferably set to at least M+($P_L$V/S) seconds, where $P_L$ is the priority-level of the major status change icon (in this example: the battery status icon 41*d*) the battery status icon 41*d* is then displayed in the rotating icon(s) 25 and/or 25*a* until the timer 56 expires.

After the timer expires, a check is made at 90 and the current icon cycle is resumed at 108 or a fresh list of status icons is generated at 104a.

It should be understood that in the embodiment shown in FIG. 5A, if the major status change has not changed when the timer 56 expires (i.e. in block 145 in FIG. 5A) then it is inevitable that the major status change will be re-detected at 135 in FIG. 5A. Thus, the major status change icon will be repeatedly displayed in the rotating icon(s) 25 and/or 25a. Optionally, the major status icon is continually displayed in the rotating icon(s) 25 and/or 25a (i.e., at 145 in FIG. 5A) until either the mobile terminal 10 fails or cancels the major status change condition. For example, a dangerously low battery charge can be upgraded to a normal status condition when the user responds by changing a nearly discharged battery 52 with a freshly charged battery causing the battery monitor 51 to report a good charge on the battery.

In another embodiment of the invention, the steps at 130 (in FIGS. 4 and 5A) and 130a (FIG. 4A) maybe performed in parallel. For example, in a mobile terminal 10 having a processor that runs different programs in parallel (i.e., concurrently with other processor tasks), step 130 can be performed in parallel. For example, a concurrent thread that independently monitors for major status changes could replace the monitoring for major status changes in the mobile terminal, represented at 135 in FIGS. 4 and 5A. By concurrent thread we refer to a processor that can perform several tasks (i.e., "threads") in parallel. If the concurrent thread detects a major status change then an interrupt is generated that causes the timer 56 to expire at 125 (FIG. 4) or be reset to zero thus triggering step 104 (FIG. 4) or 104a (FIG. 5A) arid the writing of a high-priority status icon to the rotating-icon(s) 25 and/or 25a at 120 (FIG. 4) or 140 (FIG. 5A).

In another embodiment of the invention, the detection of a major status change at 135 (in FIGS. 4 and 5A) activates the vibrator 60 or the audible alarm 62 (see FIG. 3). When the vibrator 60 or audible alarm 62 is activated, the user is alerted to a major status change in the mobile terminal 10.

As should now be evident, the logic steps described with regard to FIGS. 4, 5 and 5A apply equally to the rotating-icon 25a in secondary pixel screen 15a. In another embodiment of the invention, the output written to rotating-icon 25 is mirrored in rotating-icon 25a.

In a further embodiment of the invention, the color of a status icon depends on the priority level for that icon. The rotating-icon displays high priority status icons in red and low priority status icons in black. Optionally, the user may select the color of the high versus low priority status icons.

In one embodiment, the personal reminder key 17 ("PRK 17") is actuated (e.g. manually pressed) by the user. The processor 49 and/or the personal reminder memory 53b are directly or indirectly operably coupled to the PRK 17. When the PRK 17 is actuated by the user, the user could enter a personal reminder message via keypad 16, which is stored in memory 53b, and the processor 49 selects the personal reminder icon 42, which is added to the status icons to be displayed (i.e. added to the icon cycle display list, see 85 in FIG. 4). When the personal reminder icon 42 is displayed during the icon cycle, the user is given notice that he has at least one thing to remember and could display each personal reminder message (stored in memory 53b) on screen 15. An additional personal reminder key 17 may be located in the sidewall 12a of the housing 11 so that a user could actuate the personal reminder key 17 when the housing 11 comprises of two housing sections, such as 11a and 11b, that are closed together like a clam as shown in FIGS. 2B and 2C.

In another embodiment, the screen 15 displays a screen version of the personal reminder icon key 17a (i.e., the screen version is represented by "17a " and the hardware version as "17" in FIG. 1). For example, the user scrawls the screen 15 and selects the horizontal bar 17a, which ensures that the personal reminder icon 42 is added to the icon display list. As previously noted, the user may enter a personal message via the keypad 16.

In a further embodiment, the user may enter a verbal personal message for storage in memory 53b. For example, the user could activate the personal reminder key 17 or the screen version 17a of the PRK key 17, the user enters a verbal personal reminder message via microphone 70, which is stored in memory 53b. The verbal version of the personal reminder message maybe played back via speaker 65 by a user actuating (e.g., by pressing) the playback personal reminder key ("PBPR key") 22. A screen version of the PBPR key 22 can be displayed in screen 15 and work in tandem with the PBPR key 22. For example, the user could scrawl the screen 15 and select "Playback of PR(s)" instead of actuating the PBPR key 22.

While the invention is described above in connection with preferred or illustrative embodiments, these embodiments are not intended to be exhaustive or limiting of the invention. Rather, the invention is intended to cover all alternatives, modifications and equivalents included within its spirit and scope of the invention, as defined by the appended claims. In particular, the invention applies to all kinds of pixel screens including pixel screens used by personal computers and not just to pixel screens found in mobile terminals that were used herein for purposes of clear description.

We claim:

1. A method of providing an indication of the status of operating conditions of a mobile terminal, comprising:

monitoring conditions of a first operating parameter of said mobile terminal;

monitoring conditions of a second operating parameter of said mobile terminal;

assigning priority levels to different conditions of said first and second operating parameters;

assigning different status icons to each priority level; and sequentially displaying, on an assigned display area on said mobile terminal, selected status icons associated with said conditions of said first and second operating parameters determined in said steps of monitoring conditions of said first and second operating parameters, each of said selected status icons being displayed for a variable selected time period based on its assigned priority level.

2. The method according to claim 1, wherein said variable selected time period for each of said selected status icons corresponds to M+(PV/S), wherein M is a minimum display time period for each status icon, P is the priority associated with said selected status icon about to be displayed in said display area, S is a sum of all the priority levels associated with all of said selected status icons, and V=T−MN, where T is a total period of time allocated to sequentially display said selected status icons, and N is the number of selectee status icons.

3. The method according to claim 1, wherein said first operating parameter is battery power and said second operating parameter is signal strength.

4. The method according to claim 1, wherein said first operating parameter includes a critical condition and said status icon assigned to said priority level assigned to said critical condition is immediately displayed when said critical condition is monitored.

5. The method according to claim 4, further comprising activating a vibrator when said critical condition is monitored.

6. A mobile terminal usable in a cellular network, comprising:

a housing;

at least one screen attached to said housing, wherein a defined area in said at least one screen is dedicated to sequentially displaying a plurality of selected status icons;

a first detector monitoring a first operating parameter of said mobile terminal for determining a priority level of said first operating parameter;

a second detector monitoring a second operating parameter of said mobile terminal for determining a priority level of said second operating parameter;

a memory storing a first set of status icons associated with said priority levels of said first operating parameter and a second set of status icons associated with said priority levels of said second operating parameter; and a processor operably coupled to said at least one screen, said memory, and said first and second detectors, said processor selecting said status icon from said first set associated with said priority level of said first operating parameter determined by said first detector and selecting said status icon from said second set associated with said priority level of said second, and controlling sequential display of said selected status icon from said first set and said selected status icon from said second set for time periods dependent on said priority levels of each of said first and second operating parameters determined by said first and second detectors.

7. The mobile terminal of claim 6, wherein said at least one screen comprises at least one pixel screen.

8. The mobile terminal of claim 6, wherein said first detector monitors battery power and said second detector monitors signal strength.

9. The mobile terminal of claim 6, further comprising a personal reminder key, and wherein said memory further stores a reminder icon associated with said personal reminder and said processor includes said reminder icon in said controlled sequential display of said selected status icons when said personal reminder key is activated by a user.

10. The mobile terminal of claim 6, wherein one of said priority levels said first operating parameter is a major status change and said processor controls display of said selected status icons by immediately displaying the status icon from said first set associated with said major status change in said at least one screen.

11. The mobile terminal of claim 10, wherein said mobile terminal further comprises a vibrator positioned in said housing and operably coupled to said processor, said processor activating said vibrator in response to said first detector determining said priority level of said first operating parameter to be said major status change.

12. The mobile terminal of claim 10, wherein said mobile terminal further comprises an audible alarm positioned in said housing and operably coupled to said processor, said processor activating said audible alarm in response to said first detector determining said priority level of said first operating parameter to be said major status change.

13. The mobile terminal of claim 6, wherein said time periods dependent on said determined priority levels corresponds to M+(PV/S), wherein M is a minimum display time for each status icon, P is the priority level associated with said selected status icon about to be displayed in said at least one screen, S is a sum of all the priority levels associated with all of said selected status icons, and V=T−MN, where T is a total period of time allocated to sequentially display said selected status icons, and N is the number of selected status icons.

* * * * *